United States Patent [19]

Sumitani

[11] Patent Number: 4,537,223
[45] Date of Patent: Aug. 27, 1985

[54] RUBBER TUBE FOR DREDGING WORK

[75] Inventor: Katsuyoshi Sumitani, Kobe, Japan

[73] Assignee: Sumitomo Gomu Kogyo Kabushiki Kaisha, Kobe, Japan

[21] Appl. No.: 487,125

[22] Filed: Apr. 21, 1983

[30] Foreign Application Priority Data

Apr. 22, 1982 [JP] Japan .............................. 57-59348[U]

[51] Int. Cl.³ .......................... F16L 11/08; F16L 11/12
[52] U.S. Cl. ..................... 138/139; 138/126; 138/174; 138/153
[58] Field of Search .............. 138/118, 125, 126, 131, 138/137, 138, 139, 172, 174, 153; 193/25 E, 25 S; 406/191, 193, 196

[56] References Cited

U.S. PATENT DOCUMENTS

| 418,695 | 1/1890 | Dean ................................... 138/139 |
| 663,570 | 12/1900 | Haviland et al. .................... 138/139 |
| 789,948 | 5/1905 | Williams .......................... 138/139 X |
| 2,661,026 | 12/1953 | Schulthess ........................... 138/131 |

FOREIGN PATENT DOCUMENTS

| 708788 | 1/1932 | France ................. 138/139 |
| 109774 | 9/1917 | United Kingdom ................ 138/139 |

Primary Examiner—James E. Bryant, III
Attorney, Agent, or Firm—Robert E. Burns; Emmanuel J. Lobato; Bruce L. Adams

[57] ABSTRACT

A rubber tube for dredging work embedded in and used in a pipe-line used for dredging work in the sea or river. This rubber tube has a tubular body made of rubber having a plurality of strengthening clothes embedded therein, and a plurality of metal rings axially arranged in a suitably spaced relation which are embedded in an inner peripheral surface of said tubular body and which inner peripheral surface forms a part of the inner peripheral surface of said tubular body. The metal rings have their joined surface with the tubular body placed in parallel to the axis and axial both ends thereof made thin in wall-thickness. Thereby, a contact area between the metal ring and the tubular body is increased to strengthen a bonding force and minimize a peeling off of the joined surface between both ends of the metal rings and the tubular body.

5 Claims, 12 Drawing Figures

RUBBER TUBE FOR DREDGING WORK

FIELD AND BACKGROUND OF THE INVENTION

The present invention relates to a construction of a rubber tube incorporated into a pipe-line for dredging work, and more particularly, to a rubber tube suitable for use in dredging crushed pieces of coral in a coral reef and crushed stones with sharp edges.

In a pipe-line for dredging work including a suction line and a delivery line used for dredging work in a river or sea, a rubber tube having a relatively large diameter is interposed between iron pipes to impart flexibility to said lines. However, where work is performed in the coral reef or in a sea or river containing crushed stones with sharp edges, crushed pieces of coral and solid particles such as crushed stones in a current of sand and earth are transported under high pressure within the pipe-line and violently impinge upon the inner peripheral surface of the rubber tube. Therefore, the inner peripheral surface of the rubber tube becomes cut and torn, and torn off by said particles, as a result of which the rubber tube becomes worn soon. Under these circumstances, various improvements have been heretofore proposed to prevent damages caused by such crushed pieces.

For example, in Japanese Utility Model application Laid-Open No. 55-34075 which was filed by the same assignee as the present application, there is proposed a rubber tube for dredging work in which a plurality of metal rings having a tapered inner surface are embedded in an inner peripheral surface of the rubber tube in a suitably spaced relation. This rubber tube is provided with a connecting fitting 1 at an axial end thereof as shown in FIG. 1, and metal rings 2 are embedded in the inner peripheral surface of the connecting fitting in an axially spaced relation. The metal rings 2 of the rubber tube 3 each has an inner peripheral surface 4 tapered towards one direction in an axial direction, said inner peripheral surface 4 being protruded from the inner peripheral surface of the rubber tube 3. Solid particles such as crushed pieces of coral contained in the current of earth and sand impinge upon the tapered inner peripheral surface 4 of the metal ring 2 and are knocked off in an axial direction, after which they are carried away by high pressure fluids and discharged into the succeeding iron pipe. This rubber tube 3 for dredging work can minimize the change for the solid particles 5 to impinge directly on the inner peripheral surface of the rubber tube by the provision of the metal rings 2, thus considerably improving the cut and tear and wear resistance of the inner peripheral surface of the rubber tube.

However, since extremely high internal pressure is applied to the rubber tube 3 during the use, the rubber itself is radially bulged and end surfaces 6 of both axial ends of the metal rings 2 embedded into the rubber tube 3 are often peeled off from the surface in contact with the rubber. It is assumed that the occurrence of such peel-off and damage of the metal rings 2 mainly results from a short of adhesive force which occurs during the step of manufacturing the rubber tube 2. That is, the method of manufacturing the rubber tube will be briefly explained. First, a plurality of metal rings 2 are positioned on a mandrel in a required spaced relation. Next, after unvulcanized rubber sheets 7 and strengthening cloth layers 8 have been successively laminated, an outer peripheral surface thereof is firmly rolled by a tape-like cloth 9 having a relatively large width. A reference numeral 10 designates a metal wire for initially tightening the structure, which is then charged into a vulcanizing can for vulcanization under predetermined vapor pressure. As may be understood from such a manufacturing operation, in the tightening of the tape-like cloth 9, a tightening force with respect to the outer peripheral surface of the metal rings 2 is different from a tightening force with respect to the rubber sheet layers 7 to produce an unbalance of the tightening force. Thus, unbalanced tightening forces are applied to the structure at a boundary line, that is, at both end surfaces 6 of the metal rings 2, and it is considered that the peel-off and damage as described above occur by a boundary tension resulting from pressures applied from unbalanced inside and outside of the rubber tube 3 or bending deformation of the rubber tube 3 when used.

The same assignee as the present application has proposed in Japanese Utility Model application Laid-Open No. 55-85163 a rubber tube for dredging work in which each metal ring is provided with a tapered cylindrical member which has a longer axial length than that of the metal ring and which is fixedly mounted by weling or the like on an inner peripheral surface of the metal ring. This rubber tube will be described with reference to FIG. 2 in accordance with the manufacturing operation. Here, the same elements as those of the aforementioned prior art embodiment of FIG. 1 bear the same reference numerals. A rubber tube 11 is made by mounting unvulcanized rubber sheets 7, strengthening cloth layers 8 and metal rings 12 whose inner peripheral surface is flat on a mandrel and thereafter vulcanizing and molding the same. The thus vulcanized and molded rubber tube 11 is removed from the mandrel, and then a tapered cylindrical member 13 having a longer axial length than the metal ring 12 is mounted on the metal ring 12. This mounting is achieved by securing an outer peripheral portion having a large diameter at one end of the cylindrical member 13 to an inner peripheral surface of the metal ring 12 by means of spot welding or the like. Accordingly, it requires trouble in molding the rubber tube 11 for dredging work, and in addition, since the metal rings 12 are embedded into the rubber sheet 7, the high temperature heat generated during the welding is directly transmitted to the rubber elastic material in the neighbourhood, of the welds the rubber material in the neighbourhood is heat-deteriorated to possibly lower the adhesive strength of the metal rings 12. Furthermore, the possible occurrence of the peel-off and damage as described above still remains.

SUMMARY OF THE INVENTION

It is an object of the present invention to provide a rubber tube for dredging work provided with metal rings which are rigidly mounted on an inner surface of the rubber tube and which can effectively cope with tear-off, wear and damage caused by crushed pieces of coral or the like.

It is a further object of the present invention to provide a rubber tube for dredging work in which a metal ring comprises a ring-like body portion and a guide ring member in the shape of a substantially truncated cone which is fitted into said body portion and receives crushed pieces of coral and the like, said guide member being welded to the body portion without causing deterioration of the rubber tube by the welding heat.

In accordance with the present invention, there is provided a rubber tube for dredging work comprising a tubular body made of rubber in which one or more strengthening clothes are embedded, and a plurality of metal rings arranged in an axially suitably spaced relation which are embedded in an inner peripheral surface of said tubular body and of which inner peripheral surface forms a part of the inner peripheral surface of said tubular body, wherein each of said metal rings has an outer peripheral surface having a surface substantially parallel to an axis of said tubular body and an inner peripheral surface having a guide portion inclined in an axial direction of the tubular body from an inlet to an outlet in the flow direction of the fluids to be dredged, and a radial thickness of both ends in an axial direction of each metal ring is thin.

In accordance with the present invention, there is further provided a rubber tube for dredging work wherein a metal ring comprises a body portion of substantially cylindrical shape embedded in an inner peripheral surface of a tubular body, and a cylindrical ring member in the shape of a substantially truncated cone fitted into said body portion. The body portion and the ring member are connected by an engaging pin one end of which protrudes from an outer peripheral surface of the ring member, and an annular groove formed in the body portion in such a manner that the other end of the engaging pin fits therein. The axial length of the ring member is greater than the length of the axial length of the body portion.

In the rubber tube for dredging work in accordance with the present invention, the outer peripheral surface of the metal ring is formed into a surface substantially parallel to the axial direction to increase the bonding force thereof with the rubber tubular body, and the radial length, that is, the thickness of both ends in a radial direction of the metal ring, is made thin to minimize peel-off thereof from the tubular member at said end surface portions.

In accordance with another preferred embodiment of the present invention, there is provided a ring member of substantially truncated cone shape whose diameter is gradually reduced from an inlet to an outlet in the flow direction of the fluids to be dredged, in a manner similar to prior arts, said ring member being mounted on the body portion of the metal ring by means of an engaging pin, said engaging pin being deposited. This deposition is applied merely to a part of the engaging pin and welding heat is transmitted to the tubular body through the pin. Thus, the heat is lowered through such a transmission medium and the rubber of the tubular body is not heat-deteriorated.

DESCRIPTION OF THE PREFERRED EMBODIMENTS

Figure 1:
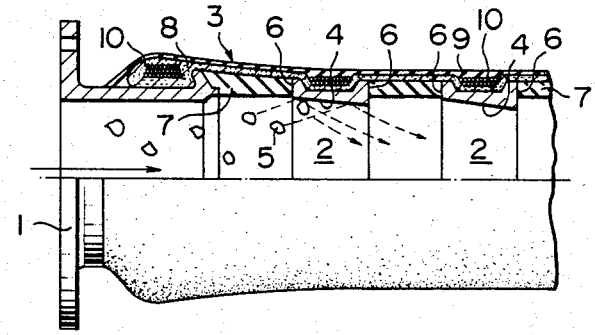
FIG. 1 is a plan view, partly cut away, of a conventional rubber tube for dredging work.
Figure 2:
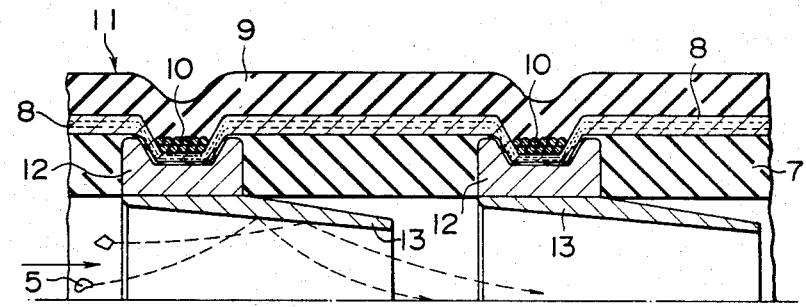
FIG. 2 is a sectional view, partly cut away, of a further form of a conventional rubber tube for dredging work.

Embodiments of a rubber tube for dredging work in accordance with the present invention will now be described. Throughout the embodiments, like elements bear like reference numerals.

Figure 3:
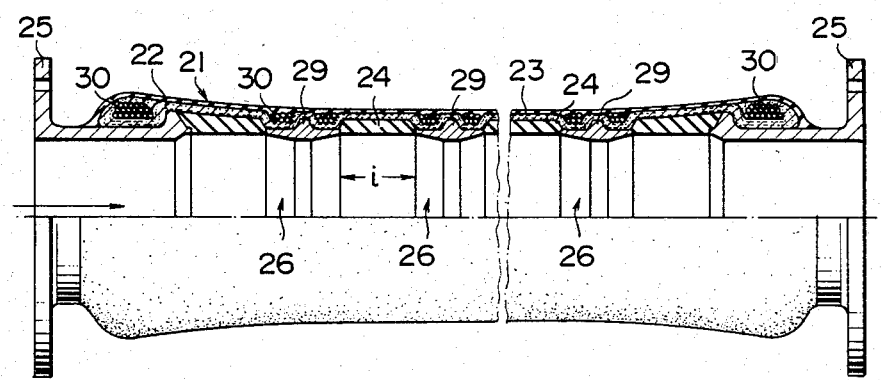
FIG. 3 is a plan view, partly cut away, showing one embodiment of a rubber tube for dredging work in accordance with the present invention.
Figure 4:
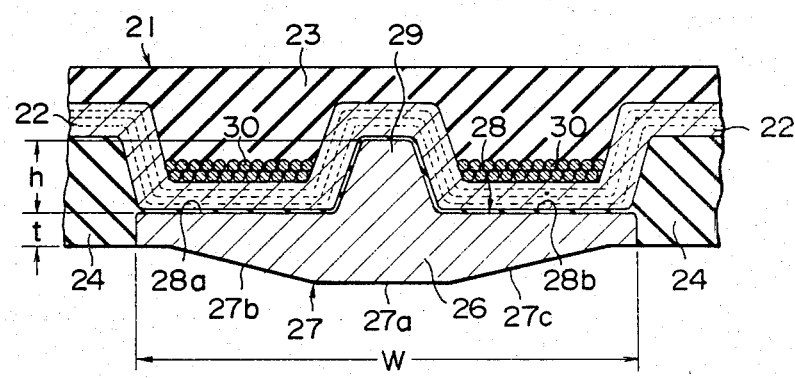
FIG. 4 is a sectional view in an enlarged scale showing a part of the rubber tube of FIG. 3.

First, a first embodiment of the present invention shown in FIGS. 3 and 4 will be described. The rubber tube for dredging work is generally indicated at 21. This rubber tube 21 is composed of an outer surface rubber layer 23 in embedded which are a plurality of strengthening cloth layers 22, and an inner surface rubber layer 24 formed integral with the inner peripheral surface of the rubber layer 23. Connecting metal pipes 25 are rigidly mounted by vulcanizing bonding to both ends in an axial direction of the rubber tube 21. Further, a plurality of metal rings 26 are embedded into the inner surface rubber layer 24 of the rubber tube 21 in such a manner that the respective inner peripheral surfaces are exposed to the inner peripheral surface of the inner surface rubber layer 24.

The metal ring 26 has an inner peripheral surface 27 of substantially convex-shaped section having a central surface 27a which extends parallel to the axial direction and left and right tapered surfaces 27b, 27c formed which are tapered from both ends of said central surface 27a to portions in the vicinity of both ends in an axial direction of the metal ring 26. An outer peripheral surface 28 of the metal ring 26 has an annular rib 29 having a section of substantially shape in the central portion and which extends in an axial direction, and left and right surfaces 28a, 28b extending from both ends of the annular rib 29 to both ends in an axial direction of the metal ring 26, said left and right surfaces 28a, 28b being parallel in an axial direction. In the first embodiment, the thickness t of the left and right ends of the metal ring 26 is about 9 mm, and the height h of the annular rib 29 is about 40 mm. Each of the metal rings 26 has its axial length, i.e., width W of 150 mm, and are embedded into the inner surface rubber layer 24 of the rubber tube 21 having the inside diameter of 700 mm at an interval i of 150 mm. In order that the rubber tube 21 may be incorporated into a delivery line of a pipe-line for dredging work, the outer peripheral portions of the connecting metal pipe and each metal ring 26 are rolled by a wire 30 through a part of the outer surface layer 23 and the strengthening cloth layers 22. It is, of course, apparent that the wire 30 can be wound about one layer of the strengthening cloth layers 22. Where the rubber tube 21 is used for a suction line, a fiber rope can be used in place of the wire 30.

In the first embodiment, the radially outer peripheral surface 28 of the metal ring 26 is formed into a surface parallel to the axial direction, and the annular rib 29 for increasing the bonding force with respect to the outer surface layer 23 is formed integral with the central portion of the outer peripheral surface 28. The metal ring 26, which has a thickness necessary for withstanding wear resulting from impingement thereon of crushed pieces of coral and crushed stones, is inevitably formed with vertical left and right ends corresponding to said thickness. However, a portion from said ends to the annular rib 29 is formed with relatively wide left and right surfaces 28a, 28b parallel to the axial direction, and said left and right surfaces 28a, 28b are firmly bonded by the outer surface rubber layer 23, the inner surface rubber layers 24 and the strengthening cloth layer 22, whereby even if a peel-off and damage should occur at said relatively thin vertical ends, further spreading of such damage can be prevented. The inner peripheral surface 27 of the metal ring 26 is symmetrically tapered from the center with respect to the axial direction. Thus, even if the left and right ends of the rubber tube 21 are connected in either normal or reverse direction with respect to the flowing direction of fluid, the metal rings 26 may effectively cope with respect to the peel-off and damage caused by impingement of the crushed pieces of coral and the like.

Figure 5:
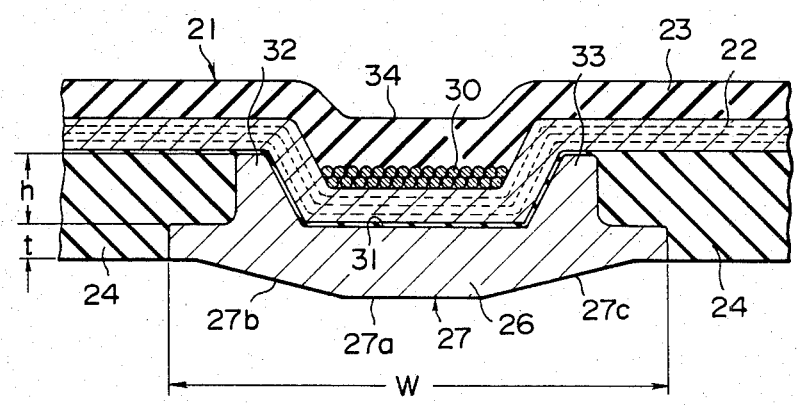
FIG. 5 is a sectional view showing a part of another embodiment of the present invention.

In a second embodiment of a rubber tube for dredging work in accordance with the present invention, two annular ribs 32, 33 similar to the above-described annular rib 29 are provided on the outer peripheral surface 31 of the metal ring 26 in a suitably spaced relation as shown in FIG. 5. A wire is tightened between the annular ribs 32 and 33. The bonding between the metal rings 26 and the rubber tube is further strengthened by these annular ribs 32, 33. An outer peripheral surface of the outer surface rubber layer 23 between said pair of annular ribs 32, 33 is formed with a concave groove 34. When a bending force is exerted on the rubber tube 21 due to movement of a work boat or a tide, etc., said concave groove 34 absorbs a compressive force acting axially of the rubber tube 21 to prevent buckling deformation of the rubber tube 21 in a direction of the inside diameter.

Figure 6:
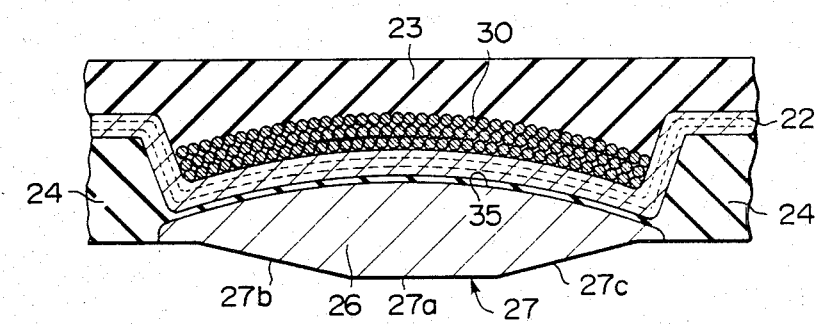
FIG. 6 is a sectional view showing a part of a still another embodiment of the present invention.

In a third embodiment of the present invention shown in FIG. 6, an outer peripheral surface 35 of the metal ring 26 is formed with a convex curved surface depicted by a gentle continuous curve. A wire 30 is evenly rolled on said outer peripheral surface 35 along said convex curved surface through the strengthening cloth layer 22 and a part of the outer surface rubber layer 23. The outer peripheral surface 35 forms the convex curved surface whereby the rolling force of the wire 30 is evenly applied and the thickness of both ends in an axial direction of the metal rings 26 can be minimized. Accordingly, the peel-off and damage at the ends hardly occur.

Figure 7:
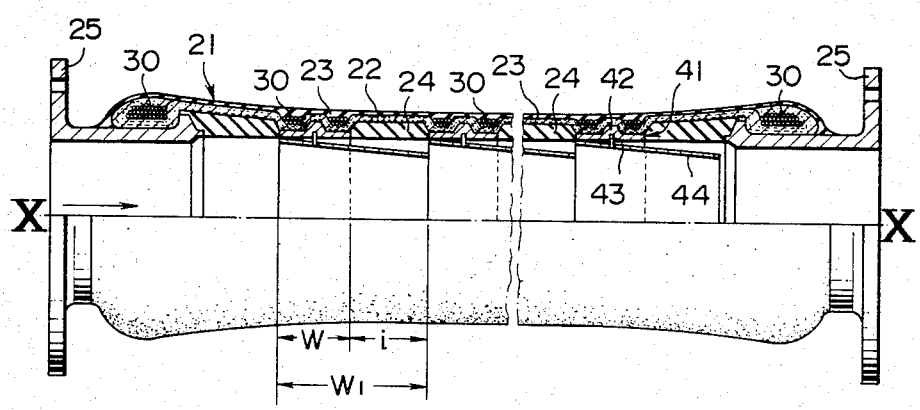
FIG. 7 is a plan view, partly cut away, showing another embodiment of the present invention.
Figure 8:
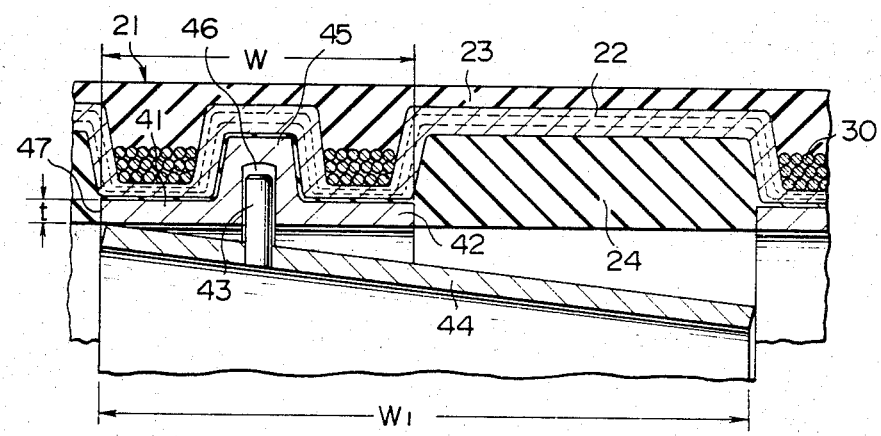
FIG. 8 is a sectional view in an enlarged scale showing the rubber tube of FIG. 7.

In a fourth embodiment of the present invention shown in FIGS. 7 and 8, there is provided a metal ring 41 which is different from those of the above-described embodiments. This metal ring 41 is composed of a cylindrical body portion 42 whose thickness t is extremely smaller than the axial length thereof, that is, smaller than the width W, and a ring member 44 in the form of a truncated cone mounted on said body portion 42 through an engaging pin 43. The body portion 42 is integrally formed with an annular rib 45 outwardly protruded in the central portion of the outer peripheral surface thereof, and the annular rib 45 is formed in its inner surface with an annular groove 46. The ring member 44 in the form of a truncated cone has an axial length, that is, the width $W_1$ dimension greater than the width W of the body portion 42.

On the outer peripheral surface close to the large-diameter end of the truncated ring member 44 protrude radially four engaging pins 43 which are protruded outwardly and which are equi-angularly disposed about the ring member 44. The engaging pins 43 are fitted into the annular groove 46 of the body portion 42 whereby the ring member 44 is coaxially mounted on the body portion 42. The large-diameter end of the ring member 44 is positioned in registration with one axial end, the left end in FIGS. 7 and 8, of the body portion 42, whereas the small-diameter end of the ring member 44 is positioned substantially in registration with the left end of the adjacent body portion 42 suitably spaced therefrom and arranged.

The truncated cone shaped ring member 44 is first inserted into the body portion 42 fixed by the rubber layers 23, 24 and strengthening cloth layers 22, after which the engaging pins 43 are inserted into holes bored before hand in the ring member 44, and the forward ends of the pins are extended into the annular groove 46. Next, the rear ends of the engaging pins 43 are secrured to the ring member 44 by welding.

In this manner, the tapered or truncated cone shaped ring member 44 may be simply mounted on the inner peripheral surface of the pre-molded rubber tube. Moreover, since the high temperature heat generated when the engaging pins are welded is transmitted to the rubber tube only through the four engaging pins 43 and the contact area between the engaging pins 43 and the body portion 42 is small, the heat transmitted to the rubber tube during the welding work is very small in amount. Accordingly, the rubber elastic material around the body portion 42 is not heat-deteriorated.

Furthermore, since the body portion 42 embedded in the inner surface layer 24 has a surface parallel to the axis which is considerably longer as compared with the end 47 perpendicular to the axis X—X, the tightening force caused by the strengthening cloth layers 22 acts on said surface when the rubber tube is vulcanized to rigidly bond it to the rubber layer. Thus, even if the peel-off from the rubber layer at the end 47 should occur, it is possible to prevent further spread of such a damage. In this embodiment, the body portion 42 of the metal ring 41 has its width W of 100 mm, whereas the thickness t is approximately 15 mm. The spacing i between the body portions 42 is set to 300 mm. Accordingly, in order to prevent the crushed pieces of coral or the like from impinging upon the inner surface rubber layer 24 between the body portions 42, the ring member 44 must have its width formed greater than the width W of the body portion 42. In the present embodiment, the width $W_1$ of the ring member 44 is set to 400 mm, and the entire inner peripheral surface of the inner surface rubber layer 24 between the body portions is covered with the ring member 44.

Since the ring member 44 is formed into a tapered configuration, the crushed pieces of coral and the like which impinge upon the ring member 44 are deflected off in an axial direction and carried away by a current of high pressure mud. It is, of course, apparent that the ring member 44 need not wholly cover the inner surface rubber layer 24 between a body portions 42 but can be of the width which terminates before the front end of the succeeding body portion 42.

Figure 9:
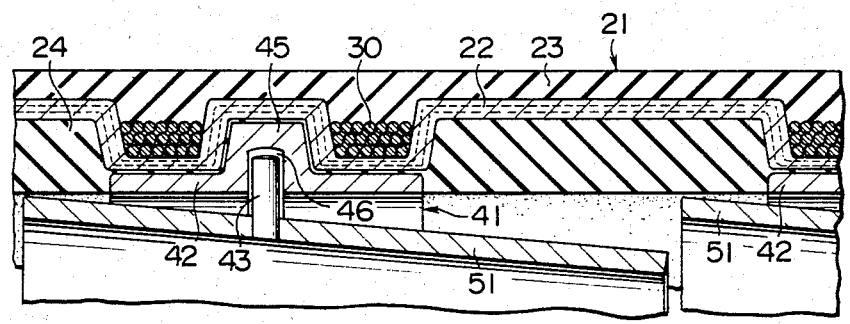
FIG. 9 through FIG. 12 are respectively views showing another embodiments, and are sectional views in an enlarged scale only for essential portions thereof.

In a fifth embodiment of the present invention shown in FIG. 9, the width of a ring member 51 is the same as the width $W_1$ of the ring member 41 in the aforementioned fourth embodiment but the mounting position of the engaging pins 43 is set somewhat closer to the small-diameter side than that of the aforementioned fourth embodiment, whereby the large-diameter end of the ring member 51 is positioned so as to protrude from one axial end of the body portion 42, i.e., from the left end in FIG. 9. Thereby, the large-diameter end of the ring member 51 can cover the inner surface rubber layer 24 on the left side of the corresponding body portion 42, and the small-diameter end of the ring member 51 can cover the inner surface rubber layer 24 on the right side of the corresponding body portion 42, thus preventing the rubber layer 24 in these portions from being peeled off and damaged by the crushed pieces of coral or the like.

Figure 10:
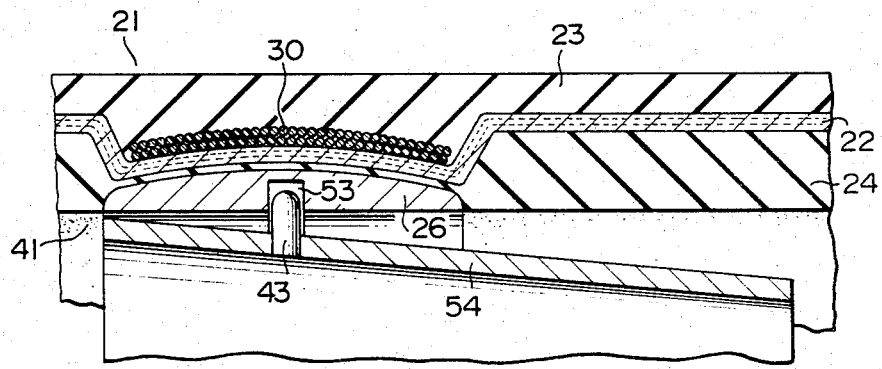

In a sixth embodiment of the present invention shown in FIG. 10, an annular groove 53 is provided in the inner peripheral surface of the metal ring 26 in the third embodiment shown in FIG. 6 and a ring member 54 in the form of a truncated cone similar to the ring members 44 and 51 as shown in FIGS. 7 to 9. Since the central portion of the metal ring 26 has a large wall-thickness, the annular rib 45 as in the aforementioned fourth and fifth embodiments need not be provided, and a groove is merely cut in said large wall-thickness portion to form the annular groove 53.

Figure 11:
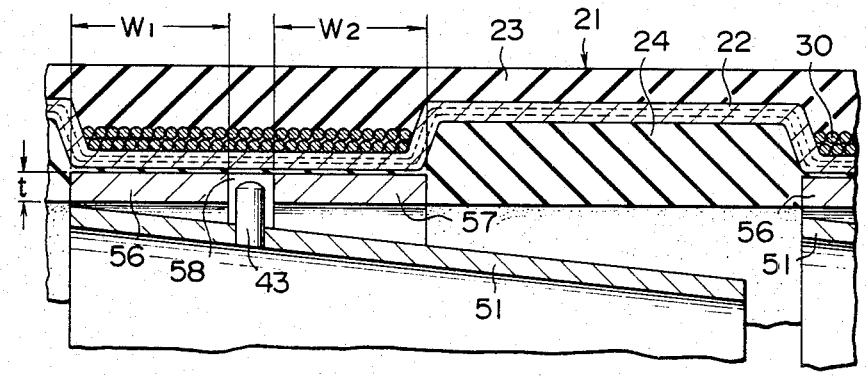

In a seventh embodiment of the present invention shown in FIG. 11, a body portion of the metal ring 41 is composed of a pair of metal web-like rings 56 and 57. Plural sets of said web-like rings 56, 57 are embedded in a suitably spaced relation along the longitudinal axis of the rubber tube 21. Between opposed ends of the pair of web-like rings 56 and 57 is formed a recessed gap 58 having a depth equal to the thickness t of these rings 56 and 57, and the distance Wa between the ends is slightly longer than the outside diameter of the engaging pins 43. The thickness t of the web-like rings 56 and 57 is far shorter than the width $W_1$, $W_2$ which is the axial length thereof similarly to the aforementioned fourth embodiment. That is, in the seventh emdbodiment, the body portion 42 is not integrally formed with the annular groove 46, as in the aforementioned fourth embodiment, but the gap 58 is provided between the opposed ends of the pair of web-like rings 56 and 57 to use it as the annular groove.

Figure 12:
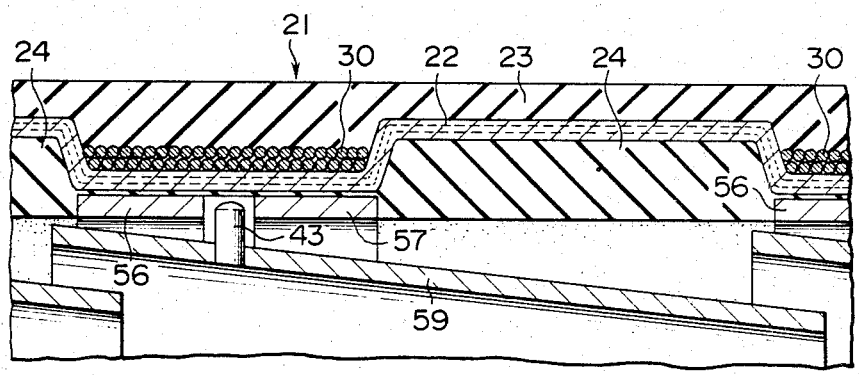

An eighth embodiment of the present invention shown in FIG. 12 has a structure similar to that of the aforementioned seventh embodiment but is constructed such that the axial length, i.e., the width of the ring member 59, is made longer than the ring member 51, and the small-diameter portion of the succeeding ring member 59 is inserted into the large-diameter end thereof and the small-diameter end inserted into the large-diameter end of the preceding ring member 59 so that they are placed one above the other. This can prevent impingement of the crushed pieces of coral or the like upon the inner surfae rubber layer 24.

What is claimed is:

1. A rubber tube for dredging work comprising: a tubular body made of rubber having one or more strengthening cloth layers embedded therein, and a plurality of metal rings axially arranged in a predetermined spaced relation and embedded in an inner peripheral surface of said tubular body such that the inner peripheral surface of each metal ring forms a part of the inner peripheral surface of said tubular body, each of said metal rings having an outer peripheral surface a portion of which extends substantially parallel to the longitudinal axis of said tubular body, and an inner peripheral surface having a central surface portion extending parallel to the longitudinal axis of said tubular body, and two tapered surface portions extending longitudinally in opposite directions from opposite ends of the central surface portion and tapering radially outwardly in the oppositely extending directions.

2. A rubber tube for dredging work according to claim 1, wherein each said metal ring has in a central portion in an axial direction of said outer peripheral surface thereof an outwardly protruding annular rib.

3. A rubber tube for dredging work according to claim 1, wherein said outer peripheral surface of said metal ring is formed with an outwardly protruded first annular rib axially spaced from one end thereof and an outwardly protruded second annular rib axially spaced from said first annular rib and axially spaced from the other end of said outer peripheral surface.

4. A rubber tube for dredging work according to claim 1, wherein each said metal ring has opposite end portions in the axial direction thereof, the end portions having a radial thickness less than the radial thickness of the remaining portion of the metal ring.

5. A rubber tube for dredging work according to claim 4, wherein the opposite end portions of each metal ring have inner peripheral surface portions extending parallel to the longitudinal axis of said tubular body.

* * * * *